UNITED STATES PATENT OFFICE.

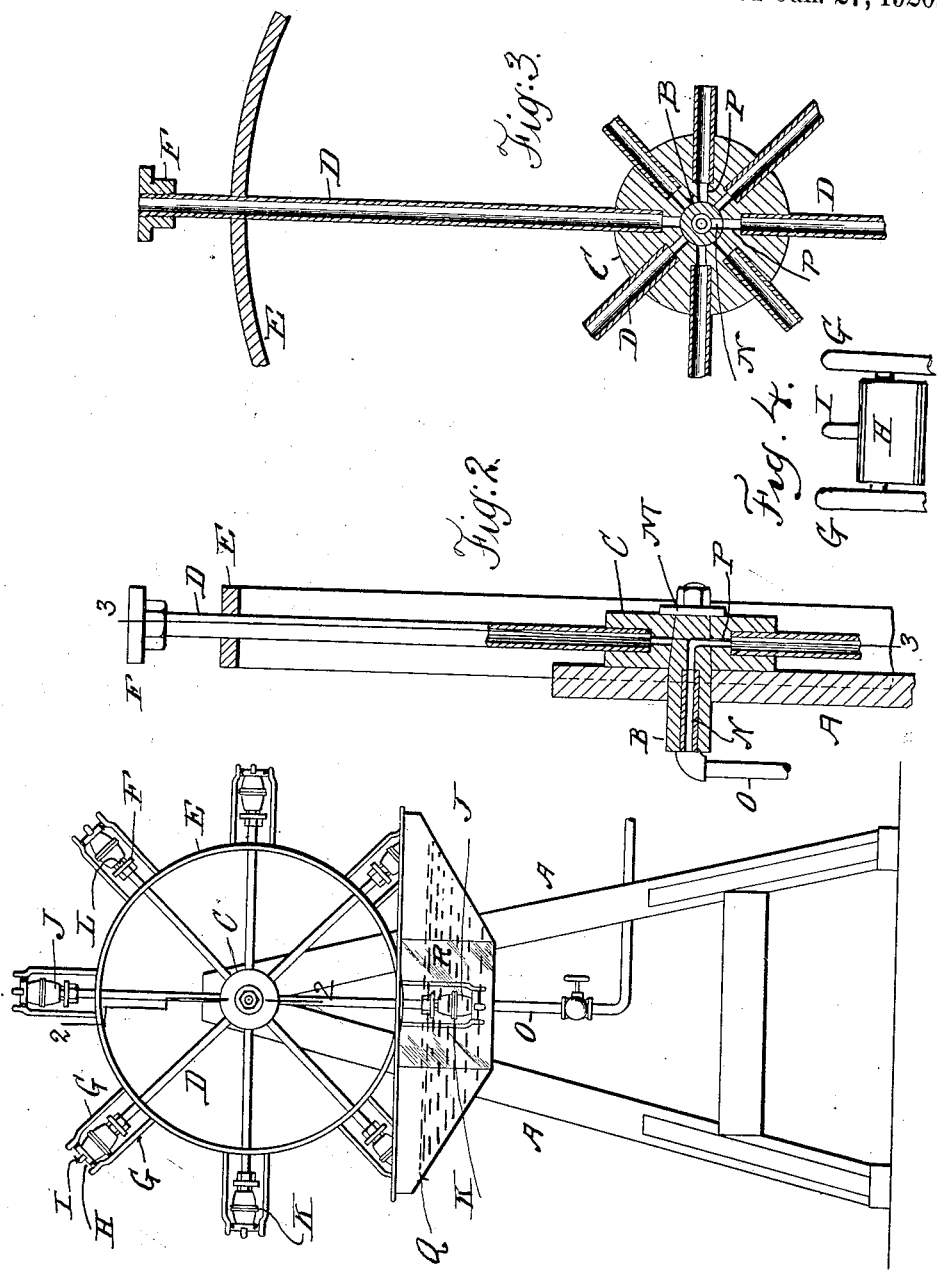

GEORGE W. CHRISTIANS, OF BROOKLYN, NEW YORK, ASSIGNOR TO THOMAS E. MURRAY, OF NEW YORK, N. Y.

APPARATUS FOR TESTING GAS-LEAKAGE.

1,329,160.      Specification of Letters Patent.      Patented Jan. 27, 1920.

Application filed July 30, 1918. Serial No. 247,465.

*To all whom it may concern:*

Be it known that I, GEORGE W. CHRISTIANS, a citizen of the United States, residing at Brooklyn, in the county of Kings and State of New York, have invented a certain new and useful Improvement in Apparatus for Testing Gas-Leakage, of which the following is a specification.

The invention is an apparatus for testing the perviousness to leakage of an electrically welded joint in the wall of a gas confining shell. I herein show my invention applied to the testing of a hand grenade designed to contain a lethal or irritative gas under pressure, the said gas being freed upon the rupture of the grenade after being thrown. The pressure commonly employed is about 2,000 pounds per square inch. A leaky joint in such a projectile renders it exceedingly dangerous to handle or store, and, therefore, the proof of imperviousness obtainable by the present apparatus is of obvious importance.

In the accompanying drawings—

Figure 1 is a front elevation of my apparatus. Fig. 2 is a section on the line 2, 2 of Fig. 1. Fig. 3 is a section on the line 3, 3 of Fig. 2. Fig. 4 is an enlarged elevation of one of the clamping cams.

Similar letters of reference indicate like parts.

A, A are supporting standards united at their upper ends and receiving the fixed pivot B, upon which turns the hub C. Radiating from hub C and preferably seated at their ends against shoulders therein is a number of tubular shell supporting spokes D which near their outer ends are secured to and pass through the circular band E. On the outer ends of said spokes D are flanged collars F, threaded to engage said spokes.

On the band E are pairs of standards G. Between the members of each pair of standards is pivoted a clamping cam H, having a stud I for conveniently rotating the same. The grenades J to be tested are hollow and have flattened ends, one of said ends having a central opening. Said grenades are formed of two cup-shaped sections of thin metal placed with their edges registering and united by the electrically welded joint at K, which it is the object of the present device to test by internal gas pressure. At the opening in the end of each grenade is secured a fuse tube L which registers with the open end of one of the spokes D, when said grenade is placed upon the collar F and between said collar and a clamping cam H. By rotating said cams, said grenades are firmly clamped in position upon the several spokes D.

On the end of pivot B, which receives hub C, is a threaded bolt, upon which is placed a washer M and securing nut, whereby said hub is held in place upon pivot B. In pivot B is a longitudinal passage N into which enters pipe O, which communicates with any source of testing gas—such as air under pressure. Passage N is turned to form a port in the circumferential periphery of pivot B. In the hub are radial passages P, respectively communicating with the tubular spokes D. By rotating the hub, the passages P may be brought successively into communication with the port aforesaid, so that the testing gas entering passage N will pass through said port to the passages P in turn and so to the tubular spokes D and the grenades to be tested clamped on the ends of said spokes. As said hub is rotated, each grenade in turn is brought into testing position.

On the front sides of the standards A is secured a tank Q containing water of sufficient depth to permit each grenade in turn to be immersed, as shown in Fig. 1, with its electrically welded joint at K submerged. In the front wall of the tank is set a glass plate R which permits said submerged joint to be clearly seen.

The joint is tested by admitting a gas such as compressed air under pressure to enter the grenade while immersed as described. If the joint be faulty, said gas will leak through and appear on the outside of the grenade, bubbling up through the water in tank Q. If, on the other hand, the joint be tight, no air bubbles will appear. In practice, when the lethal gas pressure in the grenade is 2,000 pounds to the square inch, the pressure of the testing gas may be twice as great in order to insure against any possibility of the dangerous vapor escaping through an imperfect joint.

As fast as one grenade is tested, the hub is rotated to bring another grenade into testing position in the tank; the already tested grenade is removed and a new one substituted so that the operation of the device may go on continuously.

I claim:

1. An apparatus for testing perviousness to gas leakage of a gas confining shell, comprising a rotary hub, tubular spokes thereon, supporting at their outer ends and conveying gas under pressure to the shells to be tested, a tank for containing liquid placed to receive each shell in turn during the rotation of said hub, and means for removably securing the shells in line with and upon the ends of said spokes: the said securing means comprising a circular band connecting said spokes, a pair of standards secured on said band on opposite sides of each of said spokes and securing said shell between them, and means supported by said standards for clamping said shells against the ends of said spokes.

2. An apparatus for testing perviousness to gas leakage of a gas confining shell, comprising a rotary hub, tubular spokes thereon, supporting at their outer ends and conveying gas under pressure to the shells to be tested, a tank for containing liquid placed to receive each shell in turn during the rotation of said hub, and means for removably securing the shells in line with and upon the ends of said spokes: the said securing means comprising a device for supporting the shell with its gas-receiving opening in registry with the end of a tubular spoke, and means for clamping said shell in said position.

In testimony whereof I have affixed my signature in presence of two witnesses.

GEORGE W. CHRISTIANS.

Witnesses:
 GERTRUDE T. PORTER,
 MAY T. McGARRY.